(12) United States Patent
Segawa et al.

(10) Patent No.: US 10,275,890 B2
(45) Date of Patent: Apr. 30, 2019

(54) IMAGE PROCESSING DEVICE AND METHOD FOR CREATING A BACKGROUND IMAGE

(71) Applicant: Sony Interactive Entertainment Inc., Tokyo (JP)

(72) Inventors: Hiroyuki Segawa, Kanagawa (JP); Tetsugo Inada, Kanagawa (JP); Akio Ohba, Kanagawa (JP); Hirofumi Okamoto, Tokyo (JP); Atsushi Kimura, Tokyo (JP); Daisuke Tahara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 192 days.

(21) Appl. No.: 15/351,821

(22) Filed: Nov. 15, 2016

(65) Prior Publication Data

US 2017/0148172 A1  May 25, 2017

(30) Foreign Application Priority Data

Nov. 20, 2015 (JP) ................................. 2015-227610

(51) Int. Cl.
| | | |
|---|---|---|
| *G06K 9/34* | (2006.01) | |
| *G06T 7/143* | (2017.01) | |
| *G06T 7/254* | (2017.01) | |
| *G06T 7/11* | (2017.01) | |
| *G06T 7/174* | (2017.01) | |
| *G06T 7/194* | (2017.01) | |

(52) U.S. Cl.
CPC ................ *G06T 7/143* (2017.01); *G06T 7/11* (2017.01); *G06T 7/174* (2017.01); *G06T 7/194* (2017.01); *G06T 7/254* (2017.01); *G06T 2207/20076* (2013.01); *G06T 2207/20081* (2013.01)

(58) Field of Classification Search
CPC ......... G06T 7/194; G06T 7/11; G06K 9/4642; G06K 9/00369; G06K 9/6212; G06K 9/6221

See application file for complete search history.

(56) References Cited

U.S. PATENT DOCUMENTS

| | | | | |
|---|---|---|---|---|
| 2010/0045799 A1* | 2/2010 | Lei | ..................... | G06K 9/00369 348/169 |
| 2013/0147951 A1* | 6/2013 | Brown | ................... | G01N 25/18 348/143 |
| 2013/0322517 A1* | 12/2013 | Zurpal | ................... | H04N 19/56 375/240.02 |
| 2014/0157209 A1* | 6/2014 | Dalal | ..................... | G06F 3/017 715/863 |
| 2016/0070963 A1* | 3/2016 | Chakraborty | ........ | G06K 9/6271 386/241 |

FOREIGN PATENT DOCUMENTS

| | | |
|---|---|---|
| JP | 2009031939 A | 2/2009 |
| JP | 2009069996 A | 4/2009 |
| JP | 2009265827 A | 11/2009 |

* cited by examiner

*Primary Examiner* — Euengnan Yeh
(74) *Attorney, Agent, or Firm* — Matthew B. Dernier, Esq.

(57) ABSTRACT

Disclosed herein is an image processing device including a background model creation section adapted to create a plurality of background models based on statistical distribution of a plurality of image frame sets, the image frame sets differing in length of time, and each of the image frame sets including a plurality of input frames; and a background image creation section adapted to create a background image by referring to the plurality of background models.

10 Claims, 5 Drawing Sheets

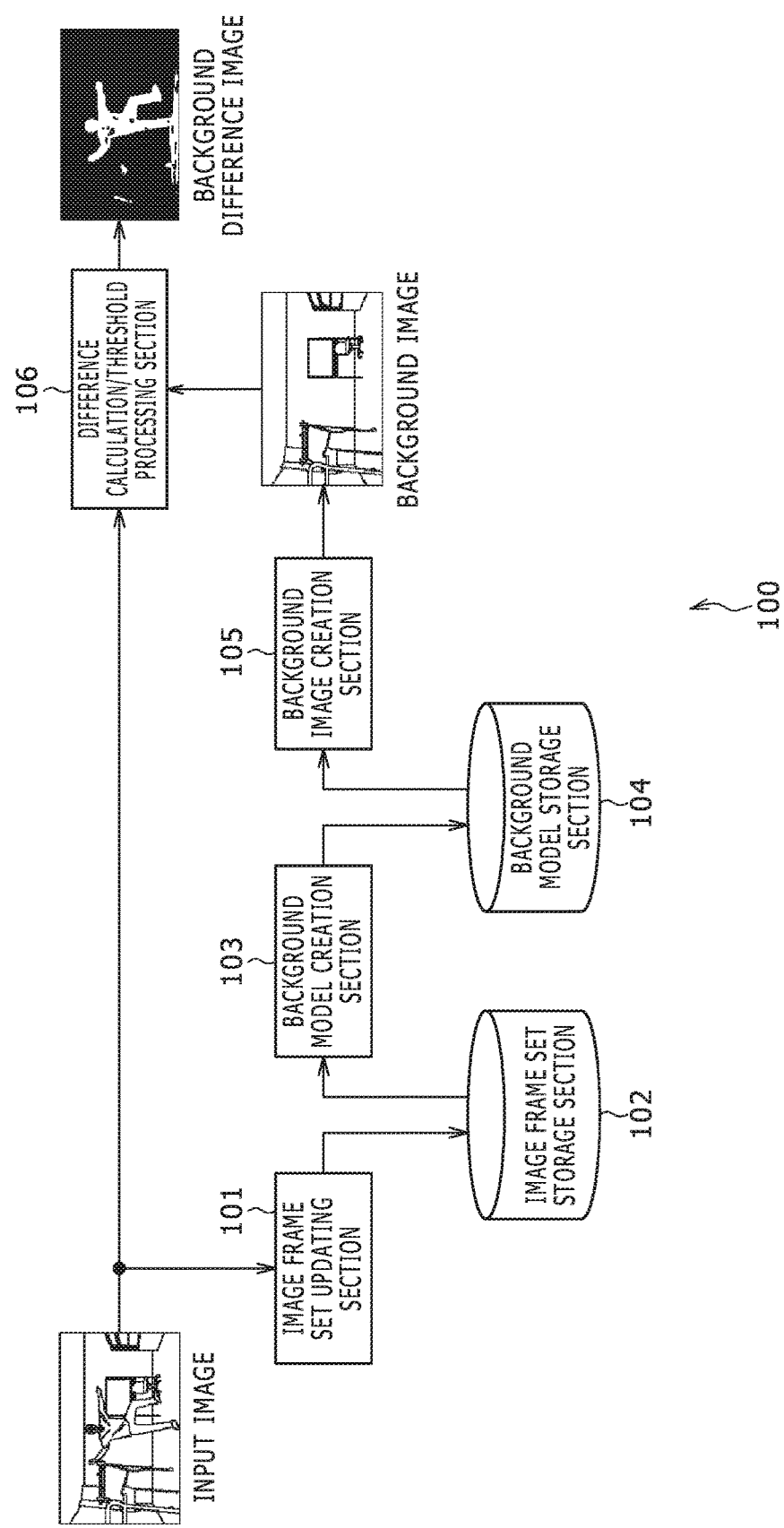
F I G . 1

IMAGE PROCESSING DEVICE AND METHOD FOR CREATING A BACKGROUND IMAGE

BACKGROUND

The present disclosure relates to an image processing device and method and, more particularly, to an image processing device and method that allow for stable creation of a background while adjusting to background changes.

A process for extracting an object that does not exist in a background image built in advance by comparing an input image supplied from a camera or other device and the background image is generally referred to as a background subtraction algorithm (refer, for example, to Japanese Patent Laid-Open Nos. 2009-31939, 2009-265827 and, 2009-69996).

In a background subtraction algorithm, the following hypotheses are made with respect to a background image depending on the situation to which the algorithm is applied:

Background values basically remain unchanged.

Changes in the background values fall within a given range.

Changes in the background values fall within a plurality of given ranges.

Changes in the background values can be predicted in one way or the other.

A background model statistically describes these hypotheses. Besides, a background image is obtained by processing background models in one way or the other and converting the background models into a form that can be compared with an input image (normal image data format).

Statistical distribution of a group of past input images is used to build background models. Therefore, it is preferred that the group of input images should be observed over a long period of time to stably distinguish between background and non-background.

Besides, when a practical usage environment is assumed, changes in the following are highly possible with respect to the above hypotheses:

Changes in lighting conditions (sunshine and indoor lighting)

Changes in background objects (e.g., a car enters an image frame and comes to a stop)

Changes in camera orientation

As a result, countermeasures against such changes are necessary.

SUMMARY

However, observation of a group of input images over a long period of time to stably distinguish between background and non-background leads to a contradiction which is that it is difficult to adjust to such background changes.

That is, it has been difficult to strike a balance between two contradicting objects:

Stably distinguish between background and non-background

Quickly adjust to background changes

The present disclosure has been devised in light of the foregoing, and it is desirable to create a stable background while adjusting to background changes.

An image processing device according to an embodiment of the present technology includes a background model creation section and a background image creation section. The background model creation section creates a plurality of background models based on statistical distribution of a plurality of image frame sets. The image frame sets differ in length of time, and each of the image frame sets includes a plurality of input frames. The background image creation section creates a background image by referring to the plurality of background models.

An image processing method according to another embodiment of the present technology is used by an image processing device. The image processing method creates a plurality of background models based on statistical distribution of a plurality of image frame sets. The image frame sets differ in length of time, and each of the image frame sets includes a plurality of input frames. The image processing method also creates a background image by referring to the plurality of background models.

In the embodiment of the present technology, a plurality of background models based on statistical distribution of a plurality of image frame sets are created. The image frame sets differ in length of time, and each of the image frame sets includes a plurality of input frames. Then, a background image is created by referring to the plurality of background models.

The present technology allows for creation of a stable background while adjusting to background changes.

It should be noted that the effect described in the present specification is merely illustrative, that the effect of the present technology is not limited to that described in the present specification, and that there may be an additional effect.

BRIEF DESCRIPTION OF THE DRAWINGS

FIG. 1 is a block diagram illustrating a configuration example of an image processing device to which the present technology is applied;

DETAILED DESCRIPTION OF THE PREFERRED EMBODIMENT

Figure 2:
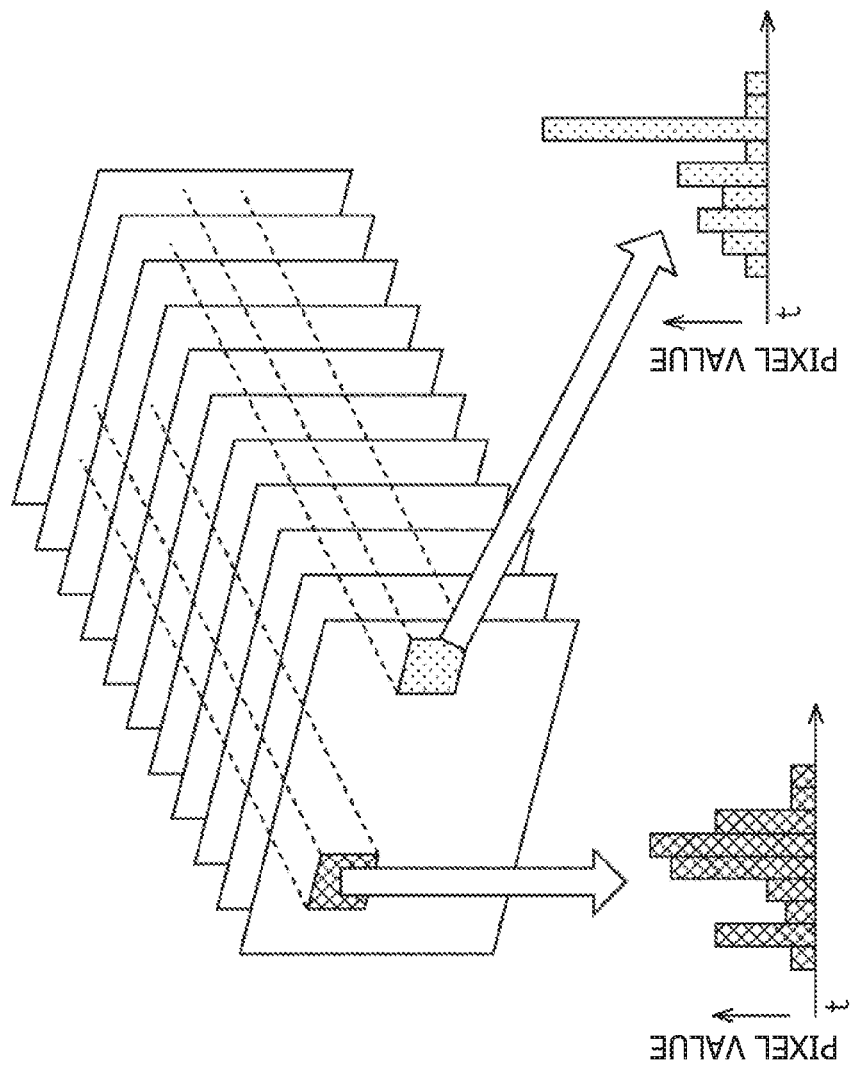
FIG. 2 is a diagram describing a background model creation method.

A description will be given below of a mode for carrying out the present disclosure (hereinafter referred to as an embodiment).

<Configuration Example of the Image Processing Device>

FIG. 1 is a block diagram illustrating a configuration example of an image processing device to which the present technology is applied. The example of FIG. 1 illustrates an image processing device which employs a background subtraction algorithm, a process that extracts an object that does not exist in a background image built in advance. Such extraction of an object is achieved by comparing an input image supplied from a camera or other device and the background image.

That is, an image processing device 100 illustrated in FIG. 1 creates a background model from an input image, creates a background image, and finds a difference in background as image processing.

In the example of FIG. 1, the image processing device 100 includes an image frame set updating section 101, an image frame set storage section 102, a background model creation section 103, a background model storage section 104, a background image creation section 105, and a difference calculation/threshold processing section 106.

The image frame set updating section 101 updates "a plurality of image frame sets that differ in length of time" stored in the image frame set storage section 102 each time an input image is updated. More specifically, the image frame set updating section 101 adds an input image to each image frame set each time a maximum number of frames of the input image specified for each image frame set (e.g., 100 frames for the first set and 1000 frames for the second set) are updated. Further, each time each image frame set exceeds its maximum frame count, the image frame set updating section 101 discards the oldest image frame in the set.

It should be noted that the following is also acceptable. That is, the image frame set updating section 101 has a "thinning interval" $N\_i$ (where i is one of a plurality of image frame sets) for each set. For an ith image frame set, the image frame set updating section 101 adds an input image to the set and discards the oldest frame in the set each time $N\_i$ frames of the input image are updated. Assuming, for example, that there are two image frame sets as a whole, and that a thinning interval $N\_1$ for the first set is 1 and a thinning interval $N\_2$ for the second set is 10, the second set holds image frames that have a ten-times longer time scale than those of the first set.

The image frame set storage section 102 stores a plurality of image frame sets that differ in length of time. It should be noted that the image frame sets may be sets with some input frames thinned out therefrom as described above. Further, the image frame sets may have the same or different first frame shooting times. That is, they may have different time axes. Still further, the plurality of image frame sets may have non-overlapping durations of shooting. That is, it is not necessary for the shooting durations of the plurality of image frame sets to match perfectly, and a partial match is sufficient.

The background model creation section 103 creates a background model by analyzing statistical distribution for each of the image frame sets stored in the image frame set storage section 102. More specifically, the background model creation section 103 creates a pixel value histogram for each pixel position as illustrated in FIG. 2 for each image frame set. As a result, a histogram set is obtained by observing each pixel position over a different length of time.

Although, in the above description, pixel values of image frame sets are directly grouped into histograms, the histograms may be approximated by appropriate mathematical formulas (e.g., high-degree polynomials). Alternatively, each histogram may be represented by a mixed Gaussian distribution.

Further, as another method for creating background histograms (method for storing past tendencies in a more pronounced manner), one frame-old histograms and histograms created at the current time by the above method from image frame sets may be mixed at a given ratio.

The background model storage section 104 stores, as a background model, a set of histograms obtained by observing each pixel location over a different length of time.

The background image creation section 105 creates a background image from background histograms as background models of the background model storage section 104. More specifically, the background image creation section 105 determines pixel values of a background image from the plurality of histograms obtained by observing each pixel over a different length of time. In the case of a background, the pixel values are approximately constant.

Therefore, a clear peak (i.e., most frequent position (pixel value)) is formed in every histogram. As a result, a background value is fixed by determining whether or not there is any clear peak in a histogram. It should be noted that when a maximum value, i.e., a top portion, has sharpness higher than a given threshold, this value should preferably be considered a peak.

A description will be given below using two kinds of (long- and short-term) histograms having different lengths of time for simplicity. It should be noted that more than two kinds of histograms may also be used.

The background image creation section 105 determines whether or not each of the long- and short-term histograms has a peak and determines the peak of either of the two histograms as a background value. More specifically, the long-term histogram is used preferentially over the short-term one to determine a background value. It should be noted, however, that a background value is determined by using the short-term histogram only if the long-term histogram peak is ambiguous and if the short-term histogram peak is sharp. As a result, a background image is created.

The difference calculation/threshold processing section 106 compares the background image created by the background image creation section 105 and the input image of the current frame, thus separating background and non-background areas. More specifically, when an absolute value of a difference between pixel values is greater than a predetermined given threshold, this area is considered a "non-background area." Otherwise (when the absolute value is equal to or smaller than the threshold), this area is considered a "background area." Alternatively, a "normalized cross-correlation" of a pixel patch centering around a pixel position of interest may be calculated and compared against a threshold.

<Processing Example of the Image Processing Device>

A description will be given next of image processing performed by the image processing device 100 with reference to the flowchart illustrated in FIG. 3.

In step S101, the image frame set updating section 101 loads an input image. In step S102, the image frame set updating section 101 updates a plurality of image frame sets stored in the image frame set storage section 102 that differ in length of time.

In step S103, the background model creation section 103 creates background models by analyzing a statistical distribution for each of the image frame sets stored in the image frame set storage section 102.

In step S104, the background image creation section 105 creates a background image from background histograms as background models of the background model storage section 104. Although details of this background image creation process will be described later with reference to FIG. 4, pixel values of the background image are determined from a plurality of histograms that are obtained by observing each pixel over a different length of time to create the background image in step S104.

In step S105, the difference calculation/threshold processing section 106 calculates difference and processes a threshold. That is, the difference calculation/threshold processing section 106 compares the background image created in step S104 and the input image of the current frame, thus separating background and non-background areas and creating a background difference image.

A background difference image is created as described above.

A description will be given next of the background image creation process in step S104 of FIG. 3 with reference to FIG. 4. It should be noted that this process is performed for each pixel.

In step S131, the background image creation section 105 determines whether or not there is a peak in the short-term histograms (hereinafter designated as H0) of the plurality of histograms obtained by observation over different lengths of time. When the background image creation section 105 determines in step S131 that there is a peak in the short-term histograms (H0), the process proceeds to step S132.

In step S132, the background image creation section 105 determines whether or not there is a peak in the long-term histograms (hereinafter designated as H1). If the background image creation section 105 determines in step S132 that there is no peak in the long-term histograms (H1), the process proceeds to step S133. In step S133, the background image creation section 105 creates a background image pixel by using the peak H0 of the short-term histograms as a background pixel value.

When the background image creation section 105 determines in step S132 that there is a peak in the long-term histograms (H1), the process proceeds to step S134. In step S134, the background image creation section 105 determines whether or not the short-term histogram peak H0 and the long-term histogram peak H1 have the same pixel value.

When the background image creation section 105 determines in step S134 that the short-term histogram peak H0 and the long-term histogram peak H1 have the same pixel value, the process proceeds to step S135. In step S135, the background image creation section 105 creates a background image pixel by using the short-term histogram peak H0 (i.e., peak H1 of the long-term histograms) as a background pixel value.

On the other hand, if the background image creation section 105 determines in step S131 that there is no peak in the short-term histograms (H0), the background image creation section 105 determines that it is not a background region but a player region and the process proceeds to step S136. In step S136, the background image creation section 105 determines whether or not there is a peak in the long-term histograms (H1). When the background image creation section 105 determines in step S136 that there is a peak in the long-term histograms (H1), the process proceeds to step S137.

Further, if the background image creation section 105 determines in step S134 that the short-term histogram peak H0 and the long-term histogram peak H1 do not have the same pixel value, the process also proceeds to step S137.

In step S137, the background image creation section 105 creates a background image pixel by using the long-term histogram peak H1 as a background pixel value.

If the background image creation section 105 determines in step S136 that there is no peak in the long-term histograms (H1), the process proceeds to step S138. In step S138, the background image creation section 105 determines that the peak is unknown because of the lack of a peak in both of the histograms. However, if either of the histograms is selected, the background image creation section 105 creates a background image pixel by using, for example, the long-term histogram peak H1 as a background pixel value.

Figure 3:
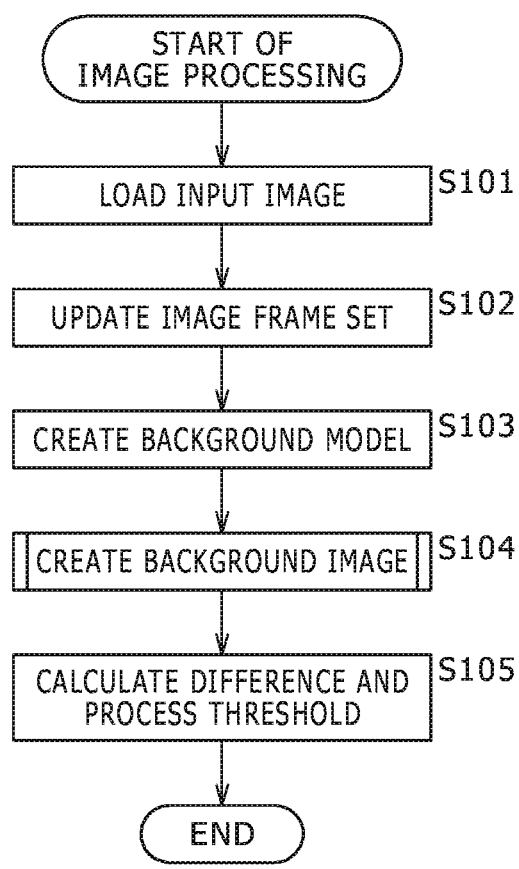
FIG. 3 is a flowchart describing image processing handled by the image processing device.
Figure 4:
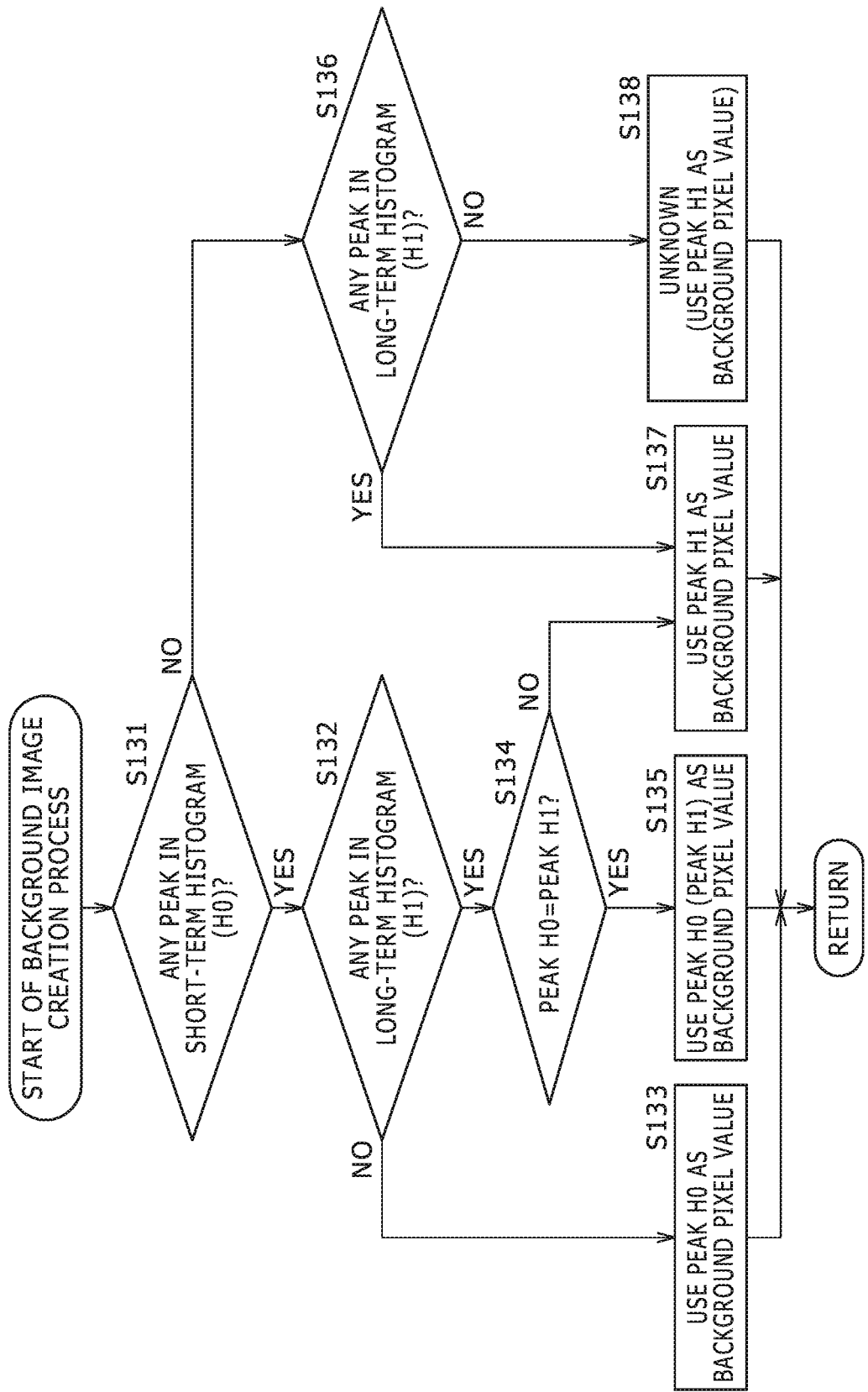
FIG. 4 is a flowchart describing a background image creation process in step S104 of FIG. 3.

After each of steps S133, S135, S137, and S138, the process returns to step S104 in FIG. 3 and then proceeds to step S105.

As described above, preference is given to long-term histograms over short-term ones to determine a background value when the background image is created. A background value is determined by using the short-term histogram only if the long-term histogram peak is ambiguous and if the short-term histogram peak is sharp.

Thus, the present technology has a plurality of background models based on statistical distribution of a plurality of image frame sets that differ in length of time as a background subtraction algorithm. Background models are built by referring to the plurality of background models.

This ensures improvement in two contradicting characteristics, namely, stable capability to distinguish between background and non-background, a feature obtained by observation of a group of input images over a long period of time and capability to quickly adjust to background changes, a feature obtained by observation of a group of input images over a short period of time.

Thus, the present technology allows for stable creation of a background while adjusting to background changes.

<Personal Computer>

The above series of processes may be performed by software or hardware. If the series of processes are performed by software, a program making up the software is installed to a computer. Here, the computer includes not only computers that are built into dedicated hardware but also general-purpose personal computers capable of executing a variety of functions as a result of installation of a variety of programs.

Figure 5:
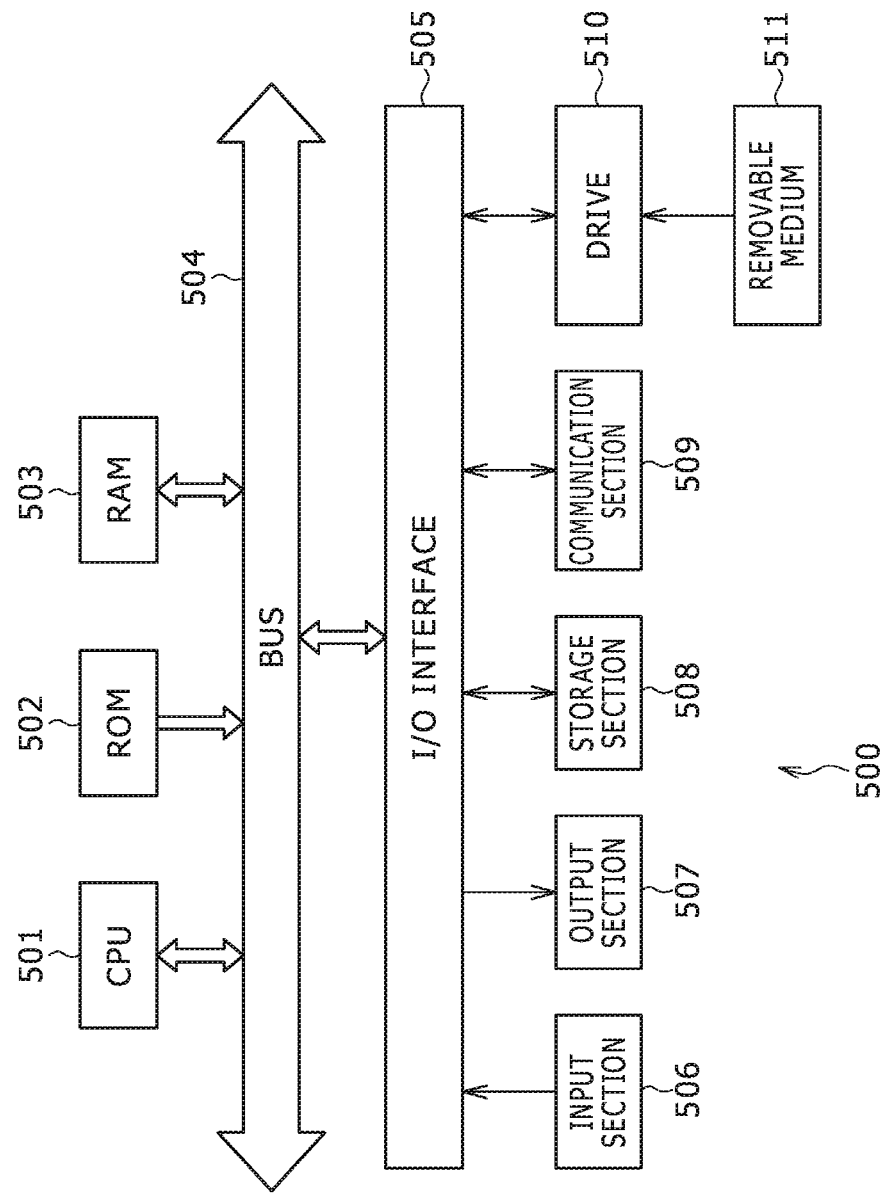
FIG. 5 is a block diagram illustrating a configuration example of a personal computer.

FIG. 5 is a block diagram illustrating a hardware configuration example of a personal computer for executing the above series of processes by using a program.

In a personal computer 500, a CPU (Central Processing Unit) 501, a ROM (Read Only Memory) 502, a RAM (Random Access Memory) 503 are connected to each other by a bus 504.

An I/O (Input/Output) interface 505 is further connected to the bus 504. An input section 506, an output section 507, a storage section 508, a communication section 509, and a drive 510, are connected to the I/O interface 505.

The input section 506 includes a keyboard, a mouse, a microphone, and so on. The output section 507 includes a display, a speaker, and so on. The storage section 508 includes a harddisk, a non-volatile memory, and so on. The communication section 509 includes a network interface and so on. The drive 510 drives a removable medium 511 such as magnetic disk, optical disc, magneto-optical disk, or semiconductor memory.

In the personal computer 500 configured as described above, the CPU 501 loads a program from the storage section 508 into the RAM 503 for execution via the I/O interface 505 and the bus 504, thus allowing the above series of processes to be performed.

The program executed by the computer (CPU 501) can be recorded on the removable medium 511 to be supplied. The removable medium 511 is, for example, a package medium that includes, for example, a magnetic disk (including flexible disk), an optical disc (e.g., CD-ROM (Compact Disc-Read Only Memory), DVD (Digital Versatile Disc)), a magneto-optical disk, or a semiconductor memory. Further, the program can be supplied via a wired or wireless transmission medium such as local area network, the Internet, or digital satellite broadcasting.

The program can be installed to the storage section 508 of the computer via the I/O interface 505 by inserting the removable medium 511 into the drive 510. Alternatively, the program can be received by the communication section 509 via a wired or wireless transmission medium and installed to the storage section 508. In addition to the above, the program can be installed in advance to the ROM 502 or the storage section 508.

It should be noted the program executed by the computer may perform the processes chronologically in accordance with a sequence described in the present specification. Alternatively, the program may perform the processes in parallel or when necessary as when the program is invoked.

Further, steps that describe the program recorded in the recording medium include not only the processes performed chronologically in accordance with the described sequence but also those that are performed in parallel or individually if not necessarily performed chronologically.

In the present specification, the term "system" refers to an apparatus as a whole that includes a plurality of devices.

For example, embodiments of the present disclosure are not limited to that described above and may be changed in various ways without departing from the scope of the present disclosure.

In the present disclosure, for example, a function can be provided through cloud computing in which the function is shared among a plurality of devices and handled in collaboration with each other via a network.

Further, components described in the above description as a single device (or processing section) may be separated into a plurality of devices (or processing sections). Conversely, components described in the above description as a plurality of devices (or processing sections) may be combined into a single device (or processing section). Still further, other component may be naturally added to the above components of each device (or processing section). Moreover, as long as the components or operation of the system as a whole substantially remain the same, some components of a device (or processing section) may be included in the components of other device (or other processing section). That is, the present technology is not limited to the embodiment described above and may be changed in various ways without departing from the scope of the technology.

Although a detailed description has been given of a preferred embodiment of the present disclosure with reference to the accompanying drawings, the disclosure is not limited to such an example. It is obvious that a person having ordinary knowledge in the technical field to which the present disclosure pertains can conceive of a variety of modification and correction examples within the realms of the technical idea described in the claims, and it is naturally understood that these also fall within the scope of the present disclosure.

It should be noted that the present technology may also have one of the following configurations:

(1) An image processing device that includes:
a background model creation section that creates a plurality of background models based on statistical distribution of a plurality of image frame sets, the image frame sets differing in length of time, and each of the image frame sets including a plurality of input frames; and
a background image creation section that creates a background image by referring to the plurality of background models.

(2) The image processing device of feature (1), in which
the background image creation section creates a background image by using pixel values of short-term background models created on the basis of statistical distribution of short-term image frame sets if there is no peak with sharpness higher than a threshold in long-term background models created on the basis of statistical distribution of long-term image frame sets and if there is a peak with sharpness higher than the threshold in the short-term background models, and
otherwise, the background image creation section creates a background image by preferentially using the pixel values of the long-term background models.

(3) The image processing device of feature (1) or (2) further including:
a difference calculation processing section that separates a newly supplied input frame into background and non-background areas by comparing the newly supplied input frame and the background image.

(4) The image processing device of any one of features (1) to (3) still further including:
an image frame set updating section that updates the image frame sets each time a given number of input frames are updated.

(5) The image processing device of any one of features (1) to (4), in which
the plurality of image frame sets are sets with some of the plurality of input frames thinned out therefrom.

(6) The image processing device of any one of features (1) to (5), in which
the plurality of image frame sets have different first frame shooting times.

(7) The image processing device of any one of features (1) to (6), in which
the plurality of image frame sets do not have overlapping durations of shooting.

(8) The image processing device of any one of features (1) to (7), in which
the statistical distribution is a pixel value histogram.

(9) The image processing device of any one of features (1) to (7), in which
the statistical distribution is a mixed Gaussian distribution.

(10) The image processing device of any one of features (1) to (7), in which
the statistical distribution is a function approximation of pixel value distribution.

(11) An image processing method used by an image processing device, the method including:
creating a plurality of background models based on statistical distribution of a plurality of image frame sets, the image frame sets differing in length of time, and each of the image frame sets including a plurality of input frames; and
creating a background image by referring to the plurality of background models.

The present disclosure contains subject matter related to that disclosed in Japanese Priority Patent Application JP 2015-227610 filed in the Japan Patent Office on Nov. 20, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing device comprising:
a background model creation section adapted to create a plurality of background models based on statistical distribution of a plurality of image frame sets, the image frame sets differing in length of time, and each of the image frame sets including a plurality of input frames; and a background image creation section adapted to create a background image by referring to the plurality of background models, wherein:

long-term background models contain histograms of pixel values obtained from statistical distributions of long-term image frame sets, short-term background models contain histograms of pixel values obtained from statistical distributions of short-term image frame sets, the background image creation section creates the background image by using pixel values of the short-term background models when: (i) there is no peak of pixel values higher than a threshold in the histograms of the long-term background models, and (ii) there is a peak of pixel values higher than the threshold in the short-term background models, and otherwise, the background image creation section creates the background image by preferentially using the pixel values of the long-term background models.

2. The image processing device of claim 1 further comprising: a difference calculation processing section adapted to separate a newly supplied input frame into background and non-background areas by comparing the newly supplied input frame and the background image.

3. The image processing device of claim 1 still further comprising: an image frame set updating section adapted to update the image frame sets each time a given number of input frames are updated.

4. The image processing device of claim 1, wherein the plurality of image frame sets are sets with some of the plurality of input frames thinned out therefrom.

5. The image processing device of claim 1, wherein the plurality of image frame sets have different first frame shooting times.

6. The image processing device of claim 1, wherein the plurality of image frame sets do not have overlapping durations of shooting.

7. The image processing device of claim 1, wherein the statistical distribution is a pixel value histogram.

8. The image processing device of claim 1, wherein the statistical distribution is a mixed Gaussian distribution.

9. The image processing device of claim 1, wherein the statistical distribution is a function approximation of pixel value distribution.

10. An image processing method used by an image processing device, the method comprising:

creating a plurality of background models based on statistical distribution of a plurality of image frame sets, the image frame sets differing in length of time, and each of the image frame sets including a plurality of input frames; and creating a background image by referring to the plurality of background models, wherein:

long-term background models contain histograms of pixel values obtained from statistical distributions of long-term image frame sets, short-term background models contain histograms of pixel values obtained from statistical distributions of short-term image frame sets, the creating the background image includes using pixel values of the short-term background models when: (i) there is no peak of pixel values higher than a threshold in the histograms of the long-term background models, and (ii) there is a peak of pixel values higher than the threshold in the short-term background models, and otherwise, the creating the background image includes preferentially using the pixel values of the long-term background models.

* * * * *